United States Patent
Hori

(10) Patent No.: US 7,177,086 B2
(45) Date of Patent: Feb. 13, 2007

(54) OPTICAL COMPONENT THICKNESS ADJUSTMENT METHOD, OPTICAL COMPONENT, AND POSITION ADJUSTMENT METHOD FOR OPTICAL COMPONENT

(75) Inventor: Kenji Hori, Meguro-ku (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/665,568

(22) Filed: Sep. 22, 2003

(65) Prior Publication Data

US 2004/0057122 A1   Mar. 25, 2004

Related U.S. Application Data

(62) Division of application No. 10/032,093, filed on Dec. 31, 2001, now abandoned.

(30) Foreign Application Priority Data

Jan. 5, 2001   (JP)   .............................. 2001-000278
Dec. 18, 2001  (JP)   .............................. 2001-383861

(51) Int. Cl.
  *G02B 3/00*   (2006.01)
  *C23C 16/00*  (2006.01)

(52) U.S. Cl. ........................................ 359/642; 216/26

(58) Field of Classification Search ................ 216/26, 216/109; 359/642–797
  See application file for complete search history.

(56) References Cited

U.S. PATENT DOCUMENTS 4,640,585 A    2/1987  Nojiri ......................... 359/652
4,838,266 A *  6/1989  Koziol et al. .................. 606/5
5,044,737 A    9/1991  Blankenbecler .............. 359/653
5,293,267 A *  3/1994  Nakai .......................... 359/619
5,299,062 A    3/1994  Ogata .......................... 359/571
5,418,182 A    5/1995  Ford .......................... 437/129
5,479,049 A * 12/1995  Aoki et al. .................. 257/642
5,871,653 A *  2/1999  Ling ............................ 216/2
6,075,650 A *  6/2000  Morris et al. ............... 359/641
6,091,549 A *  7/2000  McDonald et al. ......... 359/637
6,226,128 B1   5/2001  Shiozawa .................... 359/642
6,285,512 B1*  9/2001  Sudoh ........................ 359/704
6,288,846 B1   9/2001  Stone, Jr. .................... 359/742
6,421,188 B1*  7/2002  Maehara ..................... 359/741

(Continued)

FOREIGN PATENT DOCUMENTS

| JP | 5-164904 A   | 6/1993 |
| JP | A-5-150108   | 6/1993 |
| JP | 10-241214 A  | 9/1998 |
| JP | A 2000-162409 | 6/2000 |

OTHER PUBLICATIONS

Ueyanagi et al., "Proposal of a Near-Field Optical Head Using a New Solid Immersion Mirror", Japanese Journal of Applied Physics, vol. 39, pp. 888-891, 2000.

Primary Examiner—Ricky Mack
Assistant Examiner—M. Hasan
(74) Attorney, Agent, or Firm—Oliff & Berridge, PLC

(57) ABSTRACT

If after manufacture it is found that the thickness of a solid immersion lens is less than a target thickness value, an adjustment portion is adhered thereto by vapor deposition so as to reduce the amount of thickness deficiency. If the solid immersion lens is made of quartz glass, SiO$_2$ is used as the material which is vapor deposited. If the thickness of the solid immersion lens is greater than the target value, then it is reduced by etching.

5 Claims, 5 Drawing Sheets

U.S. PATENT DOCUMENTS

| | | |
|---|---|---|
| 6,451,420 B1 | 9/2002 | Jin et al. ................ 428/315.5 |
| 6,563,652 B2* | 5/2003 | Sudoh ........................ 359/704 |
| 6,914,724 B2* | 7/2005 | Redmond ................... 359/619 |
| 2002/0030898 A1* | 3/2002 | Kouchiyama et al. ...... 359/738 |
| 2003/0082299 A1 | 5/2003 | Tomofuji ................. 427/248.1 |
| 2004/0004770 A1* | 1/2004 | Ebina et al. ................ 359/648 |
| 2004/0125466 A1 | 7/2004 | Hendriks .................... 359/754 |

* cited by examiner

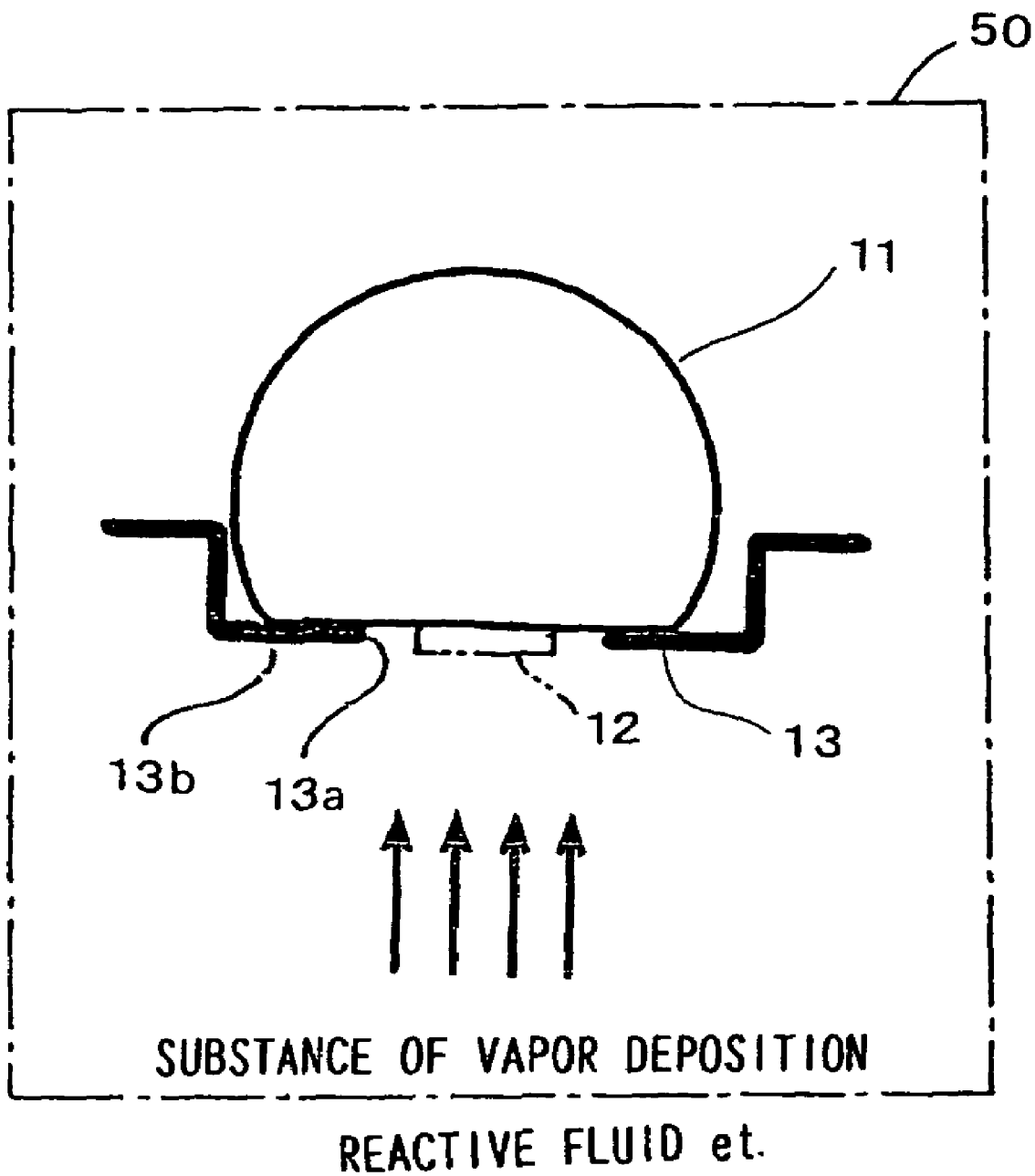

OPTICAL COMPONENT THICKNESS ADJUSTMENT METHOD, OPTICAL COMPONENT, AND POSITION ADJUSTMENT METHOD FOR OPTICAL COMPONENT

This is a Division of application Ser. No. 10/032,093 filed Dec. 31, 2001 now abandoned. The entire disclosure of the prior application is hereby incorporated by reference herein in its entirety.

INCORPORATION BY REFERENCE

The present application is founded upon Japanese Patent Application No. 2001-278, and the contents thereof are incorporated herein by reference.

BACKGROUND OF THE INVENTION

1. Field of the Invention

The present invention relates to a method of adjusting the optical thickness of an optical component such as an optical lens, a plane plate, a prism, a mirror or the like which is made from a material which has the quality of being transparent to the light to be used. The present invention also relates to an optical component of which the thickness has been adjusted by such a method, and to a method of adjusting the position of an optical component such as an optical lens, a plane plate, a prism, a mirror, or the like.

2. Related Art

Generally it is required to process the shape of an optical component at high accuracy. Among the parameters which determine the shape, surface accuracy and thickness accuracy are the items which are very important for almost all optical components. The accuracy which is required for the thickness of the optical component generally becomes more severe, the higher is the resolving power required for the entire optical system, the greater is the numerical aperture of the optical system, and the closer the position of the optical component is to the observation plane or to the image plane. In particular, very demanding accuracy is required with regard to the thickness of an optical component which is used as a so called solid immersion lens or solid immersion mirror.

Furthermore high accuracy is demanded for the thickness of an optical component, if in the same component there are multiple optical paths due to reflection or the like, or if interference of light beams is employed. Naturally, if interference of light beams is employed, the wavelength of the light to be used becomes shorter, the higher is the required accuracy for the thickness of the optical component. As methods for processing the optical surfaces of this type of component, per se known methods such as polishing, pressing, or cutting or the like may be employed.

However, the process accuracy Which has recently been required for optical components has reached the sub-micron level, and it has become impossible to provide such accuracy for the optical thickness of optical components with the use of methods such as polishing, pressing, or cutting or the like which have been employed in the past. In the same manner, the positional accuracy which is required when positioning an optical component in the optical system has reached the sub-micron level, and it has become impossible to provide such accuracy when processing a standard mounting surface of the optical component with the use of methods such as have been employed in the past.

The first objective of the present invention is to provide an optical component thickness adjustment method which can attain the optical thickness accuracy of the optical component whose level is sub-micron order.

The second objective of the present invention is to provide an optical component the accuracy of whose optical thickness is controlled to sub-micron accuracy.

The third objective of the present invention is to provide a position adjustment method for an optical component which can control attachment position to better than sub-micron accuracy.

SUMMARY OF THE INVENTION

The present invention is to provide a method of adjusting the position of at least one optical boundary surface, i.e. the optical thickness, of an optical component which is made from a material which is transparent to light to be used. The method comprises adding process. In the adding process, at least one of layers of a material which is the same as the material from which the optical component is manufactured, and of a material which has an index of refraction close to the index of refraction of the material from which the optical component is manufactured, is adhered to a surface of the optical component by at least one of vapor deposition and vapor growth, so that an optical thickness is increased.

The present invention is also to provide a method of adjusting the position of at least one optical boundary surface, i.e. the optical thickness, of an optical component comprising etching a surface of the optical component to reduce the optical thickness.

The optical thickness of an optical component which has been manufactured by the above described thickness adjustment method for an optical component is controlled to its target value with an accuracy of sub-micron order (0.01 μm). Accordingly this process is suitable for employment if a high process accuracy is required such as when a high resolving power is required, when the numerical aperture of the optical system is high, when the position of the optical component is close to the observation plane or to the image plane, or when the wavelength of the light to be used is short or the like.

Further, the present invention is to provide a method of adjusting the position of an optical component. The method comprises adhering a layer of material thereto by at least one of vapor deposition, plating, and vapor growth to change the position of at least one surface of said optical component.

In the similar manner to reduction of the thickness of an optical component as described above, the surface of the optical component can be etched to change the position of at least one surface thereof.

BRIEF DESCRIPTION OF THE DRAWINGS

FIG. 2 is an explanatory figure showing a retainer which is used when forming an adjustment portion upon a plano-convex lens.

DETAILED DESCRIPTION OF THE PREFERRED EMBODIMENTS

Figure 1A:
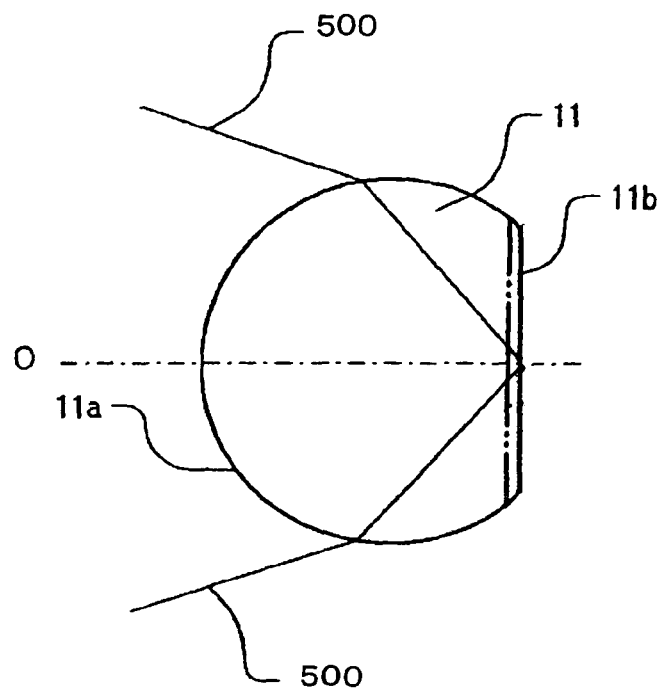
FIGS. 1A and 1B are explanatory views of a thickness adjustment method for an optical component and of a optical component made by this method according to the first embodiment of the present invention.
Figure 1B:
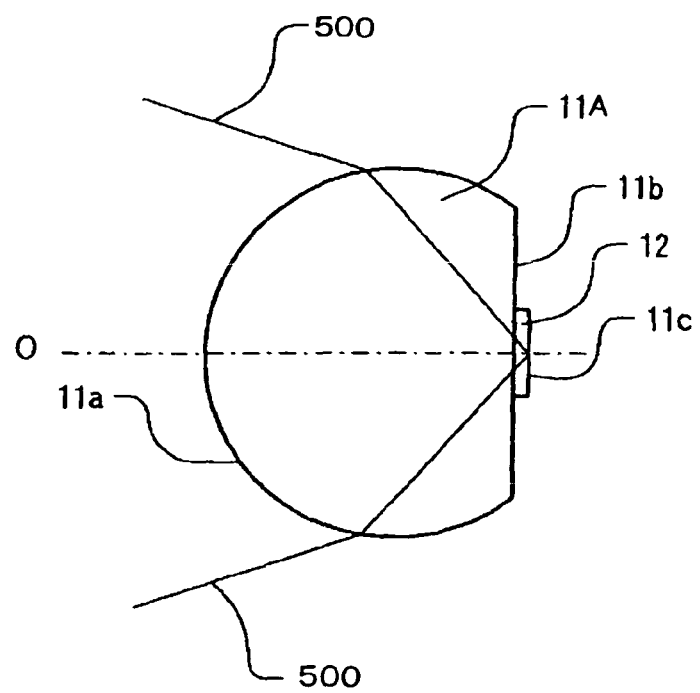

In the following various preferred embodiments of the present invention will be explained with reference to the drawings. FIGS. 1A and 1B are explanatory views of a thickness adjustment method for an optical component and of a optical component made by this method according to the first embodiment of the present invention.

As shown in FIG. 1A, a plano-convex lens 11 which is a solid immersion lens is designed such that a bundle 500 of light rays (only the outer rays of the ray bundle 500 are shown), which are incident from the left side of the figure upon a first optical surface 11a which is a spherical surface, is condensed to focus on the optical axis upon a second optical surface 11b which is a planar surface. And, for example, by positioning a workpiece to be processed near this second optical surface 11b, a desired optical process is performed upon this workpiece by the near field light from the spot on the second optical surface 11b.

In order to adjust the thickness of this solid immersion lens, it is conventional to process its planar surface. However if this lens is to be used as an aplanatic lens, it is beneficial to be able to process either its spherical surface or its planar surface. An aplanatic lens is one for which the radius of curvature of its refractive surface and the refractive index satisfy the aplanatic condition wherein the following formula is fulfilled:

distance=radius of curvature*(1+1/refractive index)

If the aplanatic condition is satisfied, it is possible to process either its planar surface or its spherical surface.

One example of a method for production of a solid immersion lens will be explained. A rectangular block of material is processed into a spherical shape and a plane cut is made through this sphere. Then the planar surface is processed so as to be smoother (for example by polishing). The thickness accuracy obtained in this way has been about ±2 µm.

With this plano-convex lens 11, in one exemplary case, the radius of curvature of the first optical surface 11a is 1.0508 mm, while the distance along the optical axis O between the first optical surface 1a and the second optical surface 11b is 1.75145 mm.

In order to satisfy the focusing condition for a solid immersion lens, and moreover in order properly to ensure the state of focusing, in other words to ensure that the shape of the point image upon the image focusing surface is sufficiently small, it is necessary to enhance the processing accuracy for the thickness of such a plano-convex lens 11 to a level close to the size of the point image obtained. In this first embodiment of the present invention, the demand is for the diameter of the point image to be within 0.0002 mm. Furthermore, since the location where the point image is formed is required to fall upon the end surface (the planar surface) of the plano-convex lens, it is necessary to control the thickness of the plano-convex lens 11 such that an error of thickness can be limited within the focal point depth of the plano-convex lens 11. Accordingly, the processing accuracy for the thickness of the plano-convex lens 11 is required to be as good or better than sub-micron accuracy (0.01 µm). With prior art processing means it has been impossible to obtain this level of manufacturing accuracy, and accordingly sometimes the second optical surface 11b has been manufactured thinner than its target value, as shown by the double-dotted line in FIG. 1A. Thus, adjustment of this thickness is performed with the method according to the present invention.

For example, an adjustment portion 12 is added by vapor deposition, as shown in FIG. 1B, in order to reduce the deficient amount of the thickness of the plano-convex lens 11A. In this first embodiment of the present invention, the plano-convex lens 11 is one which has been made from synthetic quartz, and therefore the material for vapor deposition is SiO2. In other words, the same material are used to form the plano-convex lens 11A and the vapor-depositioned adjustment portion 12.

As shown in FIG. 2, the plano-convex lens 11 is mounted upon a retainer 13 within a vapor deposition apparatus or chamber 50, and the adjustment portion 12 is formed by vapor deposition. The retainer 13 is provided with a circular aperture 13a and a support portion 13b which supports the periphery of the planar surface 11b of the plano-convex lens 11. The periphery of the planar surface 11b of the plano-convex lens 11 is mounted in contact with the support portion 13b so that the planar surface 11b faces through the circular aperture 13a towards a vapor deposition source (not shown in the drawings), and then the adjustment portion 12 is vapor deposited in the vapor deposition chamber 50.

The thickness of the layer which should be vapor-depositioned is determined by measurement of the thickness of the plano-convex lens 11 to be adjusted. It is proper to perform vapor deposition by which the thickness of the plano-convex lens increases by the difference between the target value and the detected value of the thickness of the plano-convex lens 11. It is easy to control the vapor deposition thickness within the sub-micron order.

In the case of a solid immersion lens, the optically effective region on the planar surface 11b is extremely small. As described above, the diameter of the point image is extremely small—within 0.0002 mm—and the optically effective region has a size which is several times of this order. Accordingly, it is essential to guarantee the thickness accuracy and the surface state of this effective region. The size of the circular aperture 13a is determined based upon this effective region.

With the solid immersion lens 11A to which the adjustment portion 12 has thus been attached, as shown in FIG. 1B, an incident ray bundle 500 is focused on the optical axis of the third optical surface 11c which is newly formed by the material which has been vapor-depositioned. Thus, by positioning a workpiece to be processed or to be observed near this third optical surface 11c, a desired optical process can be performed upon this workpiece by the focused light.

In this manner, with this first embodiment, if the optical thickness of the optical component which has been manufactured is thinner than its target value, then it is possible to bring this optical thickness to the target value. In other words, the optical thickness can be increased by adding to the surface of the optical component by vapor depositioning a layer of the same material as the material of the optical component, or a layer of a material having a refractive index close to that of the material of the optical component. Instead of vapor depositioning, a process of vapor growth may be used.

In the prior art, if the optical thickness of an optical component fell below the permitted range for the target value thereof, it was not possible to repair this optical component itself in order to produce an acceptable product. By contrast, according to the first embodiment of the present invention, it becomes possible to make a poor quality component into an acceptable one.

Vapor deposition and vapor growth have been used for forming thin layers, and layers of nanometer order thickness accuracy has been able to be formed by these methods. Accordingly, it is easy to control the thickness of the layer which is formed upon the surface of the optical component by the above described method to the sub-micron order (0.01 μm). The added is either the same material of the optical component to be processed, or is a material whose index of refraction is close thereto. Accordingly the added layer can be considered as a portion of the optical component itself which adds to its thickness, and as a result it is possible to consider that the optical component has an optical thickness equal to its target value.

In this specification, the term "vapor deposition" includes not only vacuum vapor deposition, but also processes such as ion plating, ion spattering and the like in which a layer is formed by ionizing a vaporized substance.

Although it is most desirable for the added material to be the same material as that of the optical component to be processed, if it is one whose index of refraction is close thereto, it can be utilized in the same manner. However, if a material is employed which has a different index of refraction, it is easily possible to determine the proper thickness thereof to be added by calculations. The permissible amount by which the index of refraction of the added material may differ from that of the material of the optical component varies according to the optical system in question. However, the permissible amount is allowed to the extent that the added material can be satisfactorily considered as being one of the optical elements of the optical system. Accordingly, this permissible variation of refractive index can easily be determined by a person ordinary skilled in the relevant art from the characteristics of the given optical system.

Figure 3A:
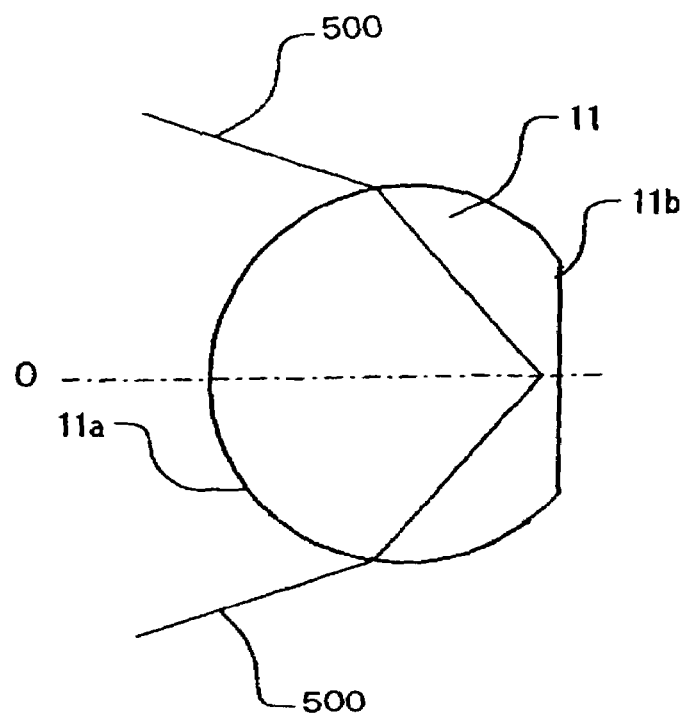
FIGS. 3A and 3B are explanatory views of a thickness adjustment method for an optical component and of a optical component made by this method according to the second embodiment of the present invention.
Figure 3B:
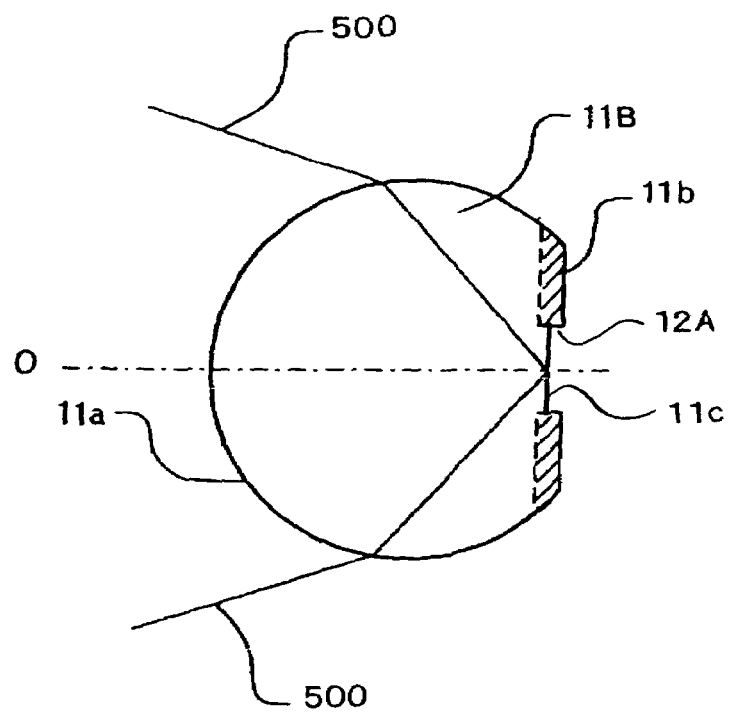

FIGS. 3A and 3B are explanatory views of a thickness adjustment method for an optical component and of a optical component made by this method according to the second embodiment of the present invention.

As shown in FIG. 3, in the case of a plano-convex solid immersion lens 11 of which the thickness before adjustment is greater than its target value, etching is performed upon the second optical surface 11b in order to bring this thickness closer to its target value. FIG. 3B shows a solid immersion lens 11B which has been adjusted to the target thickness. In this figure, the reference symbol 12A denotes a concaved out etched portion.

Process of the second embodiment will be explained referring to FIGS. 3A and 3B. The plano-convex lens 11 is supported by the retainer 13 as shown in FIG. 2. At this time, the periphery of the planar surface 11b of the plano-convex lens 11 is supported by the retainer 13, while the central portion of its planar surface 11b is exposed through the aperture 13a and is exposed to hydrofluoric acid. The region of the planar surface 11b which is not to be etched may be covered over by a mask. Hydrofluoric acid is used as the etching fluid, because it is capable of etching quartz. It is easy to control the etching thickness at the sub-micron level (0.01 μm). Thereafter, a hatched portion 12B is cut out to form a projected portion on which the third optical surface 11c has been formed by etching. It is acceptable to form a stepped portion 12B before etching. The stepped portion 12B is necessary for a workpiece to be optically processed while positioning it near the third optical surface 11c.

The second embodiment of the present invention is directed to a method in which optical thickness is reduced up to the target value. Accordingly, the method is applied to an optical component that has been manufactured according to a prior art type process, e.g. polishing, whose optical thickness is thicker than its target value. In prior art methods, if after testing the optical thickness of an optical component was found to be greater than the permitted range above its target value, then the component was again fitted to the working tool and processed again as a re-adjustment. However, it is difficult to re-mount the optical component with good accuracy, and poor accuracy in this mounting causes poor processing. In particular during mass production the productivity becomes low, because excessive trouble is required. In contrast thereto, according to this second embodiment of the present invention, it becomes possible to enhance the proportion of goods of an acceptable quality, and accordingly the productivity.

Etching is also widely used in the field of lithography. With the etching process, the thickness of a material can be decreased with an accuracy of nanometer order. Accordingly, by etching the surface of the optical component and by reducing its optical thickness, it is possible to attain the target value for this thickness at sub-micron accuracy (0.01 μm).

In this specification, the term "etching" includes, not only wet processes such as ones in which an optical component is immersed in an etching fluid, but also dry processes which take advantage of ionic reactivity, such as ion etching, ion beam etching, and the like.

Figure 4:
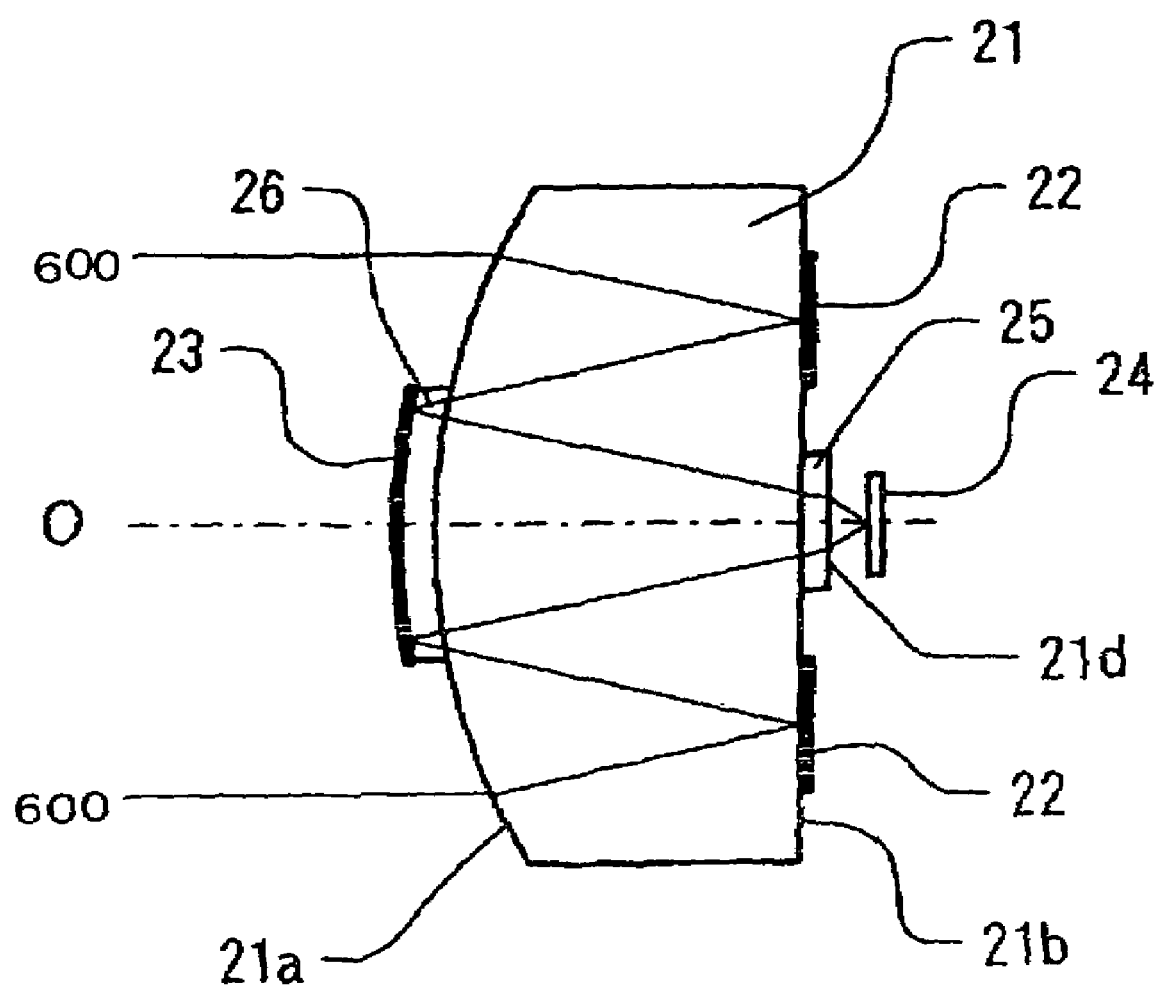
FIG. 4 is an explanatory view of a thickness adjustment method for an optical component and of an optical component made by this method of the third embodiment of the present invention.

FIG. 4 is an explanatory view of a thickness adjustment method for an optical component and of an optical component made by this method of the third embodiment of the present invention. The third embodiment relates to a method of manufacturing reflective-refractive type lens in which the thickness thereof is brought into the target value, if the optical thickness of the optical element is thinner than its target value.

Such a reflective-refractive type lens 21 is usually used as a large aperture lens for an astronomical telescope or the like, and is made so as to employ marginal rays 600 which are incident upon it. FIG. 4 shows an example of a catadioptric optical system which focuses an image of an object which is at infinity or at a very remote distance. In other words, the marginal rays 600 are incident upon a first optical surface 21a of the catadioptric optical lens 21 and are refracted. After the marginal rays 600 is reflected by reflecting layers 22 provided upon a second optical surface 21b thereof, they are again reflected by another reflecting layer 23 which is provided in the central region of the first optical surface 21a. Finally, the marginal rays 600 are refracted by the second optical surface 21b, and then focused to a focal point upon an image plane 24.

However, if the thickness of the catadioptric optical lens 21 is not equal to its target value, it cannot properly focus the light to the focal point upon the image plane 24. As will be understood from FIG. 4, the influence of deviation in the central thickness of the lens is great as compared to the case with a normal refracting lens, since the light rays cross the catadioptric optical lens 21 three times due to reflection. Accordingly, the requirements for accuracy in controlling the thickness of this portion are particularly severe.

When the thickness of the reflective-refractive type lens 21 is thinner than its target value, the adjustment portions 25 and 26 are provided at the central portion of the lens. These adjustment portions 25 and 26 are formed by vapor deposition or vapor growth. For example, if this reflective-refractive lens 21 is made from synthetic quartz, these adjustment portions 25 and 26 are formed by vapor deposition of SiO2, just as in the case of the first embodiment described above. And the thickness of the reflective-refractive lens 21 is thereby adjusted to bring this thickness to the proper value for focusing the marginal rays 600 which are parallel to the optical axis to the focal point upon the image plane 24. Thereafter, the reflective layer 23 is formed by vapor deposition or the like.

Figure 5:
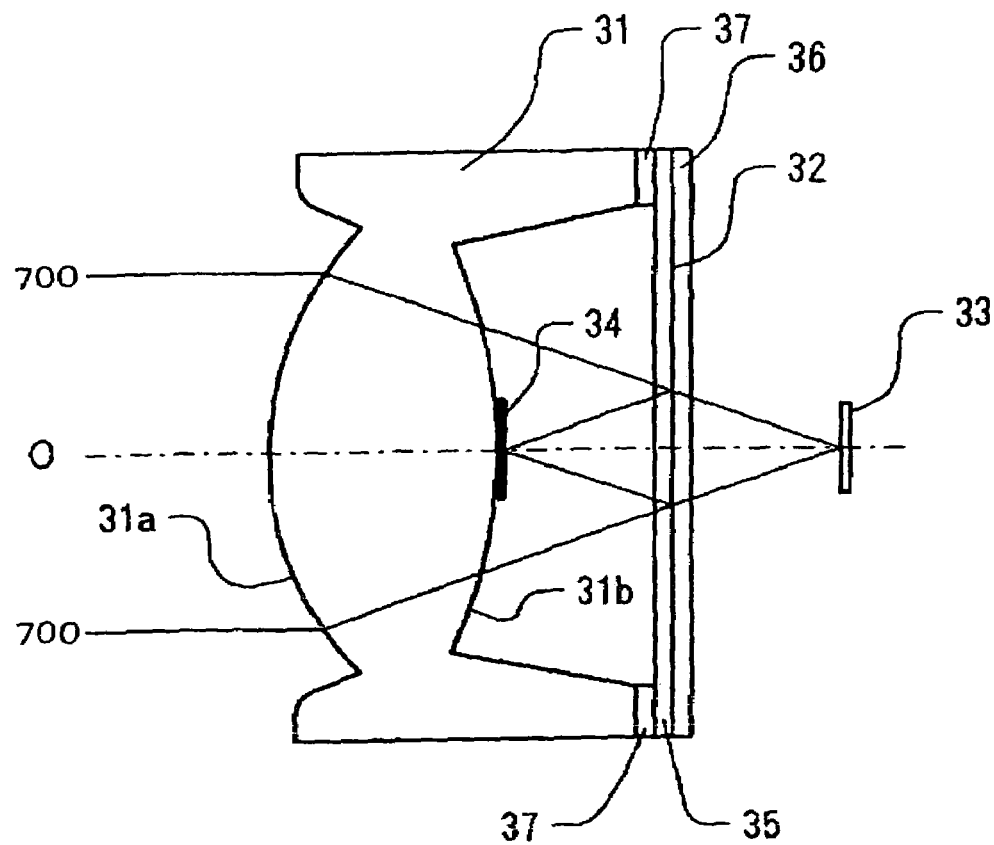
FIG. 5 is an explanatory view of a position adjustment method for an optical component according to the fourth embodiment of the present invention.

FIG. 5 is an explanatory view of a position adjustment method for an optical component according to the fourth embodiment of the present invention. This optical system is termed a Mirau interference type objective lens, and is a combination of an aspherical lens 31 and a half mirror 32. Light rays 700 parallel to the optical axis which are incident upon the incident surface 31a of the aspherical lens 31 are refracted by said aspherical lens 31, and then, a portion of these light rays passing through the half mirror 32 is focused upon an observation surface 33. Another portion of these light rays is reflected by the half mirror 32 and is focused upon a reflecting layer 34 which is provided upon a second optical surface 31b of the aspherical lens 31. The reflecting layer 34 is formed as a planar surface of area at least the same as that of the observation surface 33.

Light reflected from the observation surface 33 passes through the half mirror 32 and interferes with the light that has been reflected from the half mirror 32. The interference pattern is observed along with the image upon the image surface 33, if there is a difference between the shapes of the image surface 33 and the surface of the reflecting layer 34.

With this type of optical system, it is necessary to position the observation surface 33 and the reflecting layer 34 in optically conjugate positions in order to obtain a proper interference pattern. Accordingly a high accuracy is required for the positional relationship between the aspherical lens 31 and the half mirror 32. It should be understood that the half mirror 32 is sandwiched between two plane plates 35 and 36 that are made from a transparent material.

In this fourth preferred embodiment of the present invention, an adjustment portion 37 is provided between the aspherical lens 31 and the plane plate 35 so that the thickness thereof can be accurately controlled. This results in the positional relationship between the aspherical lens 31 and the plane plate 35 being established within the target accuracy. The adjustment portion 37 is formed as a so called washer (circular ring shaped element), and may be made by vapor deposition, plating, vapor growth, or etching in which case its thickness may be considered as being negative. It is possible to ensure sufficient strength for the adjustment portion itself by forming the adjustment portion 37 sufficiently thick. Alternatively, using the portion of the aspherical lens 31 which contacts with its effective external diameter against the plane plate 35 as a substrate just as it is, its thickness may be adjusted by vapor deposition, plating, vapor growth, or etching.

With this type of fourth embodiment, the position of the mounting surface of the optical component can be adjusted by adhering a layer of material upon this mounting surface by vapor deposition, plating, or vapor growth. Since the thickness of a layer of material which is adhered by vapor deposition, plating, or vapor growth can be controlled to an accuracy of sub-micron order. Therefore, it is possible to control the position in which the optical component is mounted to an accuracy of sub-micron order (0.01 μm), so that it is possible to provide an optical system of high precision. The same advantage is also obtainable by thinning or etching the mounting surface up to the target value.

Figure 6:
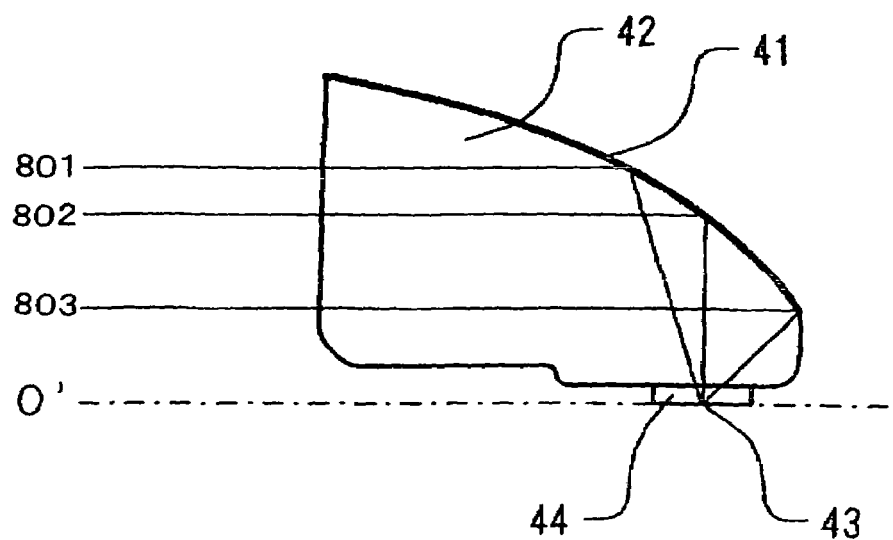
FIG. 6 is an explanatory view of a thickness adjustment method for an optical component, and of an optical component made by this method according to the fifth embodiment of the present invention.

FIG. 6 is an explanatory view of a thickness adjustment method for an optical component, and of an optical component made by this method according to the fifth embodiment of the present invention.

This optical system is a solid immersion lens which employs reflection from a surface which is a portion of a paraboloid of revolution. The outstanding characteristic of this kind of reflecting type solid immersion lens is as follows. Since the number of structural components is reduced in comparison to one which uses a refracting optical system, accordingly it is possible to enhance the compactness and reduce the weight. Consequently it is possible more quickly to shift the position of and to control the optical system. Furthermore this system has the characteristic that the range of wavelength for the light which can be used is extremely wide, since a reflecting system generates no chromatic aberration.

In FIG. 6, the surface 41 is a portion of a curved surface which is a paraboloid of revolution and is rotationally symmetric around a central axis O'. The surface 41 is positioned upon the upper side of the reflecting type solid immersion lens 42. An added reflective layer (not shown in the figure) is provided upon this surface 41 for reflecting the incident light rays as required and directing them to a focal point. Light rays 801, 802, and 803 parallel to the central axis O' of the paraboloid of revolution surface 41 are incident into the reflecting type solid immersion lens 42. Then, they are reflected off the paraboloid of revolution surface 41 and condensed at the focus 43 of the parabola.

With this reflecting type solid immersion lens 42, the paraboloid focal point 43 is required to lie upon the central axis O' and upon an end surface of this reflecting type solid immersion lens 42. In order for the paraboloid focal point 43 to fall accurately upon the lower end surface of the reflecting type solid immersion lens 42, in this fifth embodiment of the present invention, a thickness adjustment portion 44 is provided. In other words, if the thickness of the reflecting type solid immersion lens 42 is thinner than its target value, the paraboloid focal point 43 undesirably falls somewhat outside the lower end surface of the reflecting type solid immersion lens 42. Accordingly, the thickness adjustment portion 44 is adhered by vapor deposition or by vapor growth so that the thickness of the reflecting type solid immersion lens 42 can be increased by an amount corresponding to this thickness adjustment portion 44.

Conversely; if the thickness of the reflecting type solid immersion lens 42 is thicker than its target value, y the paraboloid focal point 43 undesirably falls somewhat inside the lower end surface of the reflecting type solid immersion lens 42. Accordingly, this lower surface of the reflecting type solid immersion lens 42 is etched, so that its thickness can be reduced. By doing this, it is possible to ensure that the paraboloid focal point 43 lies upon the lower end surface of the reflecting type solid immersion lens 42 to sub-micron accuracy.

Since etching can reduce the thickness of a material with an accuracy of sub-micron order, it is possible to reduce an optical thickness with sub-micron accuracy (0.01 μm)

What is claimed is:

1. A method of adjusting the optical thickness of a lens, made from a material transparent to light to be used, to obtain accuracy of sub-micron order, comprising;
   manufacturing the lens; and
   reducing the optical thickness of the manufactured lens to a target optical thickness by etching a surface of the manufactured lens when the optical thickness of the manufactured lens is greater than the target optical thickness.

2. A lens whose optical thickness has been adjusted by a method of according to claim 1.

3. A method of adjusting the optical thickness of a lens according to claim 1, wherein at least one of polishing, pressing and cutting is operated in manufacturing the lens to form the surface of the lens.

4. A method for adjusting the optical thickness of a lens according to claim 1, wherein the manufacturing lens has a thickness of millimeter order.

5. A method of adjusting the optical thickness of a lens according to claim 1, wherein the lens is a solid immersion lens.

* * * * *